US011618304B2

(12) United States Patent
Tokuno et al.

(10) Patent No.: US 11,618,304 B2
(45) Date of Patent: Apr. 4, 2023

(54) DOOR STRUCTURE OF VEHICLE

(71) Applicant: MAZDA MOTOR CORPORATION, Hiroshima (JP)

(72) Inventors: Reiko Tokuno, Aki-gun (JP); Shinsuke Hirao, Aki-gun (JP); Masahiro Nakashige, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 43 days.

(21) Appl. No.: 17/363,778

(22) Filed: Jun. 30, 2021

(65) Prior Publication Data
US 2022/0063382 A1 Mar. 3, 2022

(30) Foreign Application Priority Data
Aug. 26, 2020 (JP) .............................. JP2020-142451

(51) Int. Cl.
*B60J 5/04* (2006.01)
(52) U.S. Cl.
CPC ............ *B60J 5/0437* (2013.01); *B60J 5/0431* (2013.01)
(58) Field of Classification Search
CPC ........ B60J 5/042; B60J 5/0437; B60J 5/0431; B60J 5/0426; B60J 5/0416; B60J 5/0429; B60J 5/0423
USPC ...................................................... 296/146.6
See application file for complete search history.

(56) References Cited

U.S. PATENT DOCUMENTS

| 5,599,057 A * | 2/1997 | Hirahara | B62D 21/15 296/187.12 |
| 6,231,112 B1 * | 5/2001 | Fukumoto | B60J 5/0412 296/146.5 |
| 2010/0148535 A1 * | 6/2010 | Takahashi | B60J 5/0426 296/187.12 |
| 2014/0132029 A1 * | 5/2014 | Kuroki | B60J 5/0451 296/1.11 |

FOREIGN PATENT DOCUMENTS

| FR | 2 698 322 A1 | 5/1994 |
| JP | 2000-071770 A | 3/2000 |

(Continued)

OTHER PUBLICATIONS

The extended European search report issued by the European Patent Office dated Jan. 26, 2022, which corresponds to European Application No. 21191814.9-1015 and is related to U.S. Appl. No. 17/363,778.

*Primary Examiner* — Joseph D. Pape
*Assistant Examiner* — Veronica M Shull
(74) *Attorney, Agent, or Firm* — Studebaker & Brackett PC

(57) ABSTRACT

A hinge reinforcement comprises a reinforcement face portion which faces a door-hinge attachment face portion, an inside connection portion which longitudinally extends in a direction approaching a door center from an inside end portion, in a vehicle width direction, of the reinforcement face portion and is fixed to a door inside face portion, a first joint portion which longitudinally extends in the direction approaching the door center from the reinforcement face portion and is fixed to an impact bar, and a second joint portion which longitudinally extends in a direction away from the door center from an outside end portion, in the vehicle width direction, of the reinforcement face portion and is fixed to a door flange portion.

11 Claims, 13 Drawing Sheets

(56) References Cited

FOREIGN PATENT DOCUMENTS

| | | |
|---|---|---|
| JP | 2003-154848 A | 5/2003 |
| JP | 2010-137792 A | 6/2010 |
| WO | WO-2015104471 A1 * | 7/2015 ....... B29C 45/14786 |

* cited by examiner

DOOR STRUCTURE OF VEHICLE

BACKGROUND OF THE INVENTION

The present invention relates to a door structure of a vehicle, and specifically relates to the door structure of the vehicle which comprises an impact bar extending in a longitudinal direction and fixed inside a door body portion and a hinge reinforcement provided at a door-hinge attachment face portion where a door hinge bracket is attached inside the door body portion.

Conventionally, there is a structure shown in FIG. 12 as the above-described door structure of the vehicle. That is, a front door 90 is provided at a hinge pillar 70 via a door hinge 80 so as to be open or closed.

The above-described hinge pillar 70 is a vehicle-body reinforcing member which is formed by fixedly joining a hinge pillar outer 71, a hinge pillar reinforcement 72, and a hinge pillar inner 73 and has a hinge-pillar closed-cross section 74 extending in a vehicle vertical direction.

The above-described door hinge 80 is configured such that a vehicle-body-side hinge bracket 81 which is fastened to the hinge pillar outer 71 and a door-side hinge bracket 82 which is fastened to a door-hinge attachment face portion 94b of the front door 90 are pivotally connected together by a hinge pin 83.

The above-described front door 90 comprises a door body portion 91 and a door sash portion, and an impact bar 92 which extends in a longitudinal direction and is fixed is provided inside the door body portion 91. Further, the above-described door body portion 91 is formed integrally by joining a door outer panel 93 and a door inner panel 94 through hemming process.

The above-described door inner panel 94 comprises a door inside face portion 94a which constitutes an inside, in a vehicle width direction, of the door, a door-hinge attachment face portion 94b which extends toward an outside, in the vehicle width direction, of the door from the door inside face portion 94a, where the door-side hinge bracket 82 is fixed, and a door flange portion 94c which longitudinally extends in a direction away from a door center from an outside end portion, in the vehicle width direction, of the door-hinge attachment face portion 94b. Further, as shown in FIG. 12, a hinge reinforcement 95 which is fixed to the door-hinge attachment face portion 94b inside the above-described door body portion 91 is provided.

The hinge reinforcement 95 comprises a reinforcement face portion 95b which faces the door-hinge attachment face portion 94b, an inside connection portion 95a which longitudinally extends in a direction approaching the door center from an inside end portion, in the vehicle width direction, of the reinforcement face portion 95b, and a joint portion 95c which longitudinally extends in a direction away from the door center from an outside end portion, in the vehicle width direction, of the reinforcement face portion 95b and is fixed to the door flange portion 94c. Further, an end portion 92a of the above-described impact bar 92 which is positioned on a side away from the door center is joined to the above-described joint portion 95c.

In the conventional structure shown in FIG. 12, when a side-collision load denoted by an arrow x is inputted to the door body portion 91, the impact bar 92 is bent and deformed toward the inside of the door body portion 91 as shown by an imaginary line α in this figure, so that a force to draw the end portion 92a of the impact bar 92 toward the inside of the door body portion 91 is generated. Accordingly, the end portion 92a of the impact bar 92 is forced to be peeled off and broken by a peeling-off load generated as shown by an arrow y. This peeling-off/breakage of the end portion 92a of the impact bar 92 makes load transmission to the hinge pillar 70 (vehicle body) by way of the door hinge 80 impossible.

Herein, while increasing plate thickness of the impact bar 92 or providing some additional reinforcement may be considered in order to secure the above-described load transmission to the vehicle body by way of the door hinge 80, there causes a problem of causing a weight increase in this case.

In another conventional structure shown in FIG. 13, in place of the joint portion 95c of the hinge reinforcement 95 shown in FIG. 12, a joint portion 95d which longitudinally extends in a direction approaching a door center from the outside end, in the vehicle width direction, of the reinforcement face portion 95b is provided, and this joint portion 95d is fixedly joined to the impact bar 92.

In the conventional structure shown in FIG. 13, since the joint portion 95d is moved toward the inside of the door body portion 91 together with the impact bar when the side-collision load shown by an arrow x is inputted, the above-described peeling off generated in the structure shown in FIG. 12 does not occur, but when the side-collision large load is applied to the joint portion 95d, the reinforcement face portion 95b is peeled off from the door-hinge attachment face portion 94b as shown by an imaginary line β in FIG. 13. Accordingly, the load transmission to the hinge pillar 70 (vehicle body) by way of the door hinge 80 is made impossible.

Herein, while the increase of the plate thickness of the impact bar 92 or the hinge reinforcement 95 or providing the additional reinforcement may be considered in order to secure the above-described load transmission to the vehicle body by way of the door hinge 80 as well, there occurs the problem of weight increase, too.

In FIG. 13, the same elements as those shown in FIG. 12 are denoted by the same reference characters. In FIGS. 12 and 13, an arrow F shows a front (forward) side, in a longitudinal direction, of the vehicle, i.e., the direction away from the door center in the longitudinal direction, an arrow IN shows an inside (inward side), in a width direction, of the vehicle, and an arrow OUT shows an outside (outward side), in the width direction, of the vehicle.

Meanwhile, Japanese Patent Laid-Open Publication No. 2010-137792 (US2010/0148535 A1) discloses a door structure comprising a hinge reinforcement which is similar to the one shown in FIG. 13. That is, this hinge reinforcement is the one which comprises a hinge attachment portion which faces a door-hinge attachment face portion, an impact-bar joint portion which extends in a direction approaching a door center from an outside end portion of the hinge attachment portion and is joined to an impact bar, and a joint portion which extends in the direction approaching the door center from an inside end portion of the hinge attachment portion and is joined to a door inner panel.

Even in the conventional structure disclosed in the above-described patent document, there is room for improvement in properly securing the transmission of the side-collision load to the vehicle body by way of the door hinge.

SUMMARY OF THE INVENTION

Accordingly, an object of the present invention is to provide a door structure of a vehicle which can properly suppress the peeling off/breakage of the joint portion where the hinge reinforcement is fixed to the door flange portion and the impact bar in a vehicle side collision, reducing the structure weight as much as possible, thereby making the load transmission to the vehicle body by way of the door hinge possible.

The present invention is the door structure of the vehicle, comprising a door body portion comprising a door inside face portion constituting an inside, in a vehicle width direction, of a door, a door-hinge attachment face portion extending toward an outside, in the vehicle width direction, of the door from the door inside face portion, where a door hinge is fixed, and a door flange portion longitudinally extending in a direction away from a door center from an outside end portion, in the vehicle width direction, of the door-hinge attachment face portion, an impact bar extending in the longitudinal direction and fixed inside the door body portion, and a hinge reinforcement provided at the door-hinge attachment face portion inside the door body portion, wherein the hinge reinforcement comprises a reinforcement face portion which faces the door-hinge attachment face portion, an inside connection portion which longitudinally extends in a direction approaching the door center from an inside end portion, in the vehicle width direction, of the reinforcement face portion and is fixed to the door inside face portion, a first joint portion which longitudinally extends in the direction approaching the door center from the reinforcement face portion and is fixed to the impact bar, and a second joint portion which longitudinally extends in the direction away from the door center from an outside end portion, in the vehicle width direction, of the reinforcement face portion and is fixed to the door flange portion.

According to the present invention, since the first joint portion is provided at the door-center side which is positioned on a side of a buckling point of the impact bar in the side collision of the vehicle, the hinge reinforcement follows bending deformation of the impact bar by way of the first joint portion, so that a shearing load is inputted to the second joint portion. Accordingly, the second joint portion is suppressed from being peeled off from the door flange portion and consequently the load transmission to the vehicle body by way of the door hinge becomes possible.

Further, the side-collision load inputted to the hinge reinforcement is dispersed to the door body portion by the second joint portion, so that the pealing-off load inputted to the door-hinge attachment face portion can be suppressed as well. That is, even if the structure weight is kept light by avoiding any increase of the plate thickness or any additional reinforcement, the heeling-off/breakage of the joint portion where the hinge reinforcement is fixed to the door flange portion and the impact bar is properly suppressed in the vehicle side collision, so that the load transmission to the vehicle body by way of the door hinge becomes possible.

In an embodiment of the present invention, the first joint portion longitudinally extends in the direction approaching the door center from the outside end portion, in the vehicle width direction, of the reinforcement face portion and is fixed to the impact bar, and the first joint portion is arranged below the second joint portion.

According to this embodiment, the above-descried effects can be obtained by using a simple structure in which the first joint portion arranged below the second joint portion is configured to longitudinally extend in the direction approaching the door center from the outside end portion, in the vehicle width direction, of the reinforcement face portion and be fixed to the impact bar.

In another embodiment of the present invention, a vertical position where the first joint portion and the second joint portion convert is located between a pair of fastening points of the door hinge.

According to this embodiment, the load inputted to the fastening points of the door hinge can be reduced properly.

In another embodiment of the present invention, the inside connection portion of the hinge reinforcement comprises a first face portion which extends in the longitudinal direction and a second face portion which extends, in the vehicle width direction, toward the door inside face portion from an end portion, in the longitudinal direction, of the first face portion which is positioned on a side of the door center, and a closed-cross section portion is formed between the inside connection portion and the door body portion.

According to this embodiment, deformation of the door can be suppressed by the above-described closed-cross section portion.

In another embodiment of the present invention, the inside connection portion includes a bead which extends in the longitudinal direction.

According to this embodiment, the side-collision load can be transmitted to the door inner panel including the door inside face portion more properly.

In another embodiment of the present invention, the first joint portion of the hinge reinforcement comprises an extension portion which longitudinally extends in the direction approaching the door center from the inside end portion, in the vehicle width direction, of the reinforcement face portion, a vertical wall which extends toward the outside, in the vehicle width direction, of the door from an end portion of the extension portion which is positioned on a side of the door center, and a flange portion which extends in the longitudinal direction from an outside end portion, in the vehicle width direction, of the vertical wall and is fixed to the impact bar.

According to this embodiment, since the first joint portion is formed by the extension portion, the vertical wall, and the flange portion, the workability (processability) of the first joint portion can be improved.

In another embodiment of the present invention, the first joint portion of the hinge reinforcement longitudinally extends in the direction approaching the door center from the outside end portion, in the vehicle width direction, of the reinforcement face portion and is fixed to the impact bar, and the first joint portion and the second joint portion are located substantially at the same level.

Herein, the reinforcement face portion, the first joint portion, and the second joint portion may be formed by a single member like an extrusion article or by two separated parts. According to this embodiment, even if the structure is rather simple, the first joint portion and the second joint portion can be located substantially at the same level, so that a moment of the first joint portion which is generated at the first joint portion by the bending deformation of the impact bar can be easily transmitted to the second joint portion.

Another aspect of the present invention is the door structure of the vehicle, comprising a door body portion comprising a door inside face portion positioned on a side of an inside, in a vehicle width direction, of a door, a door-hinge attachment face portion extending toward an outside, in the vehicle width direction, of the door from the door inside face portion, where a door hinge is fixed, and a door flange portion extending rearwardly from an outside end portion, in the vehicle width direction, of the door-hinge attachment face portion, an impact bar extending in a longitudinal direction and fixed inside the door body portion, and a hinge reinforcement provided at the door-hinge attachment face portion inside the door body portion, wherein the hinge reinforcement comprises a reinforcement face portion which faces the door-hinge attachment face portion, an inside connection portion which extends forwardly from an inside end portion, in the vehicle width direction, of the reinforcement face portion and is fixed to the door inside face portion, a first joint portion which extends forwardly from the reinforcement face portion and is fixed to the impact bar, and a second joint portion which extends rearwardly from an outside end portion, in the vehicle width direction, of the reinforcement face portion and is fixed to the door flange portion.

The door structure of the vehicle according to the above-described aspect of the present invention can provide substantially the same effects as the above-described present invention.

The present invention will become apparent from the following description which refers to the accompanying drawings.

DETAILED DESCRIPTION OF THE INVENTION

Embodiment 1

Figure 2:
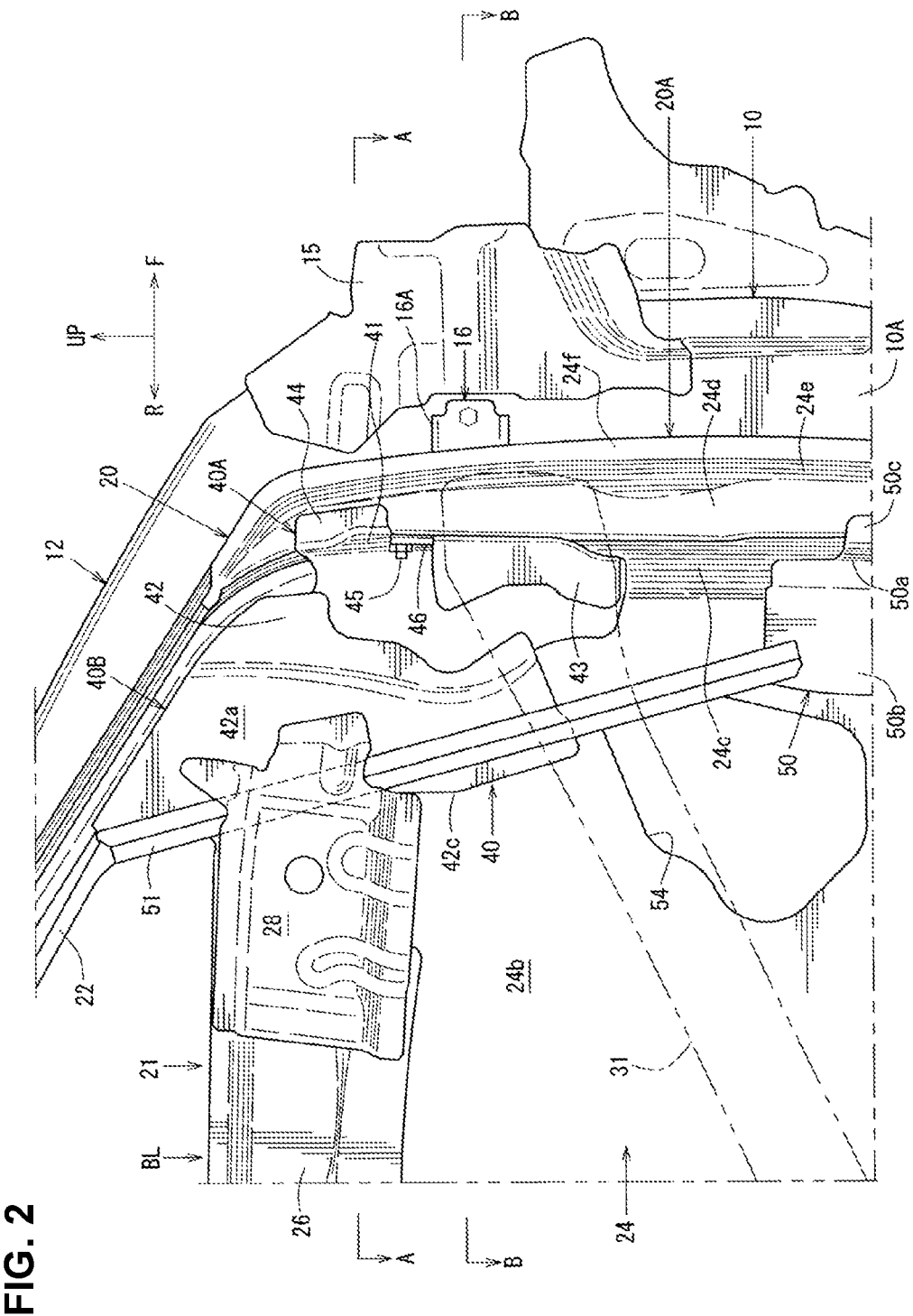
FIG. 2 is a major-part enlarged view of FIG. 1.
Figure 3:
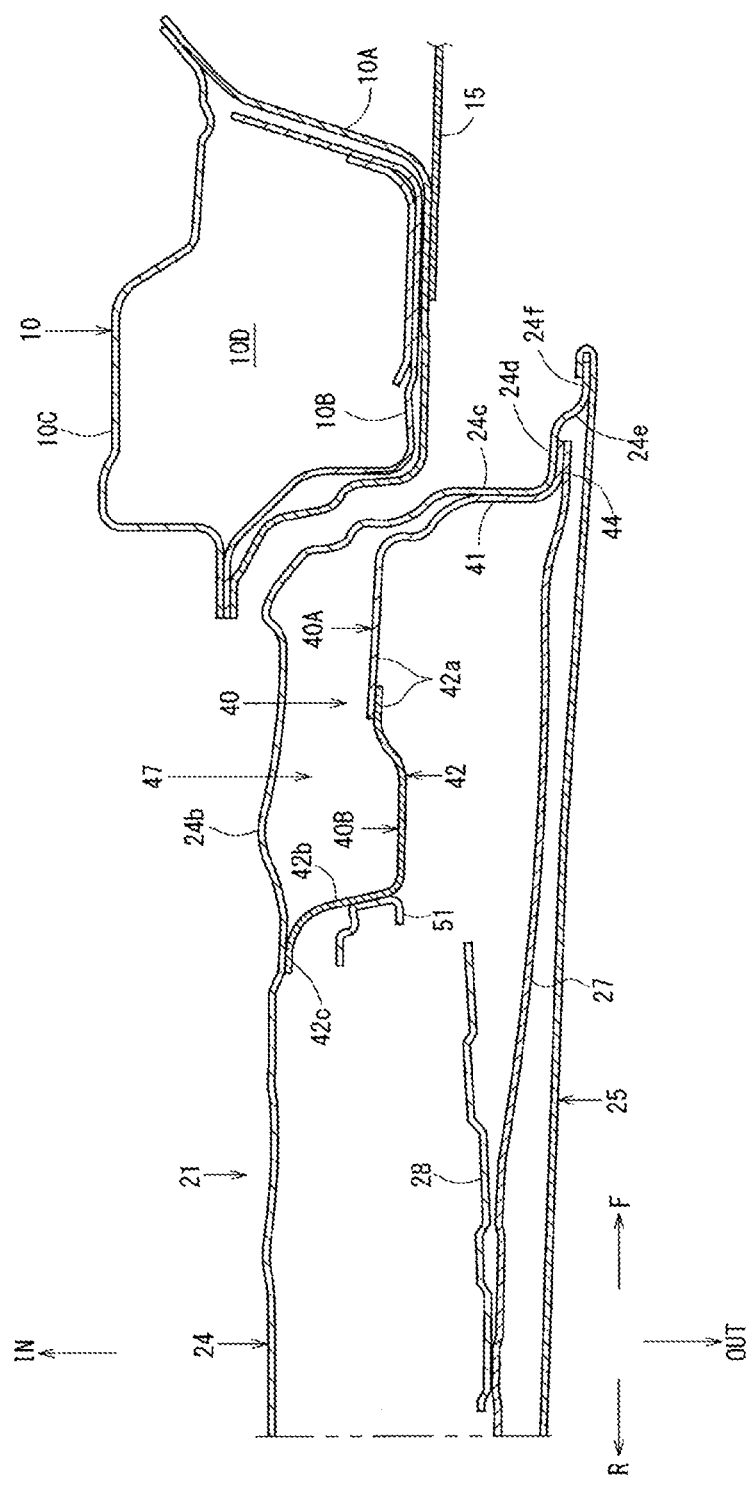
FIG. 3 is a sectional view taken along line A-A of FIG. 2.
Figure 4:
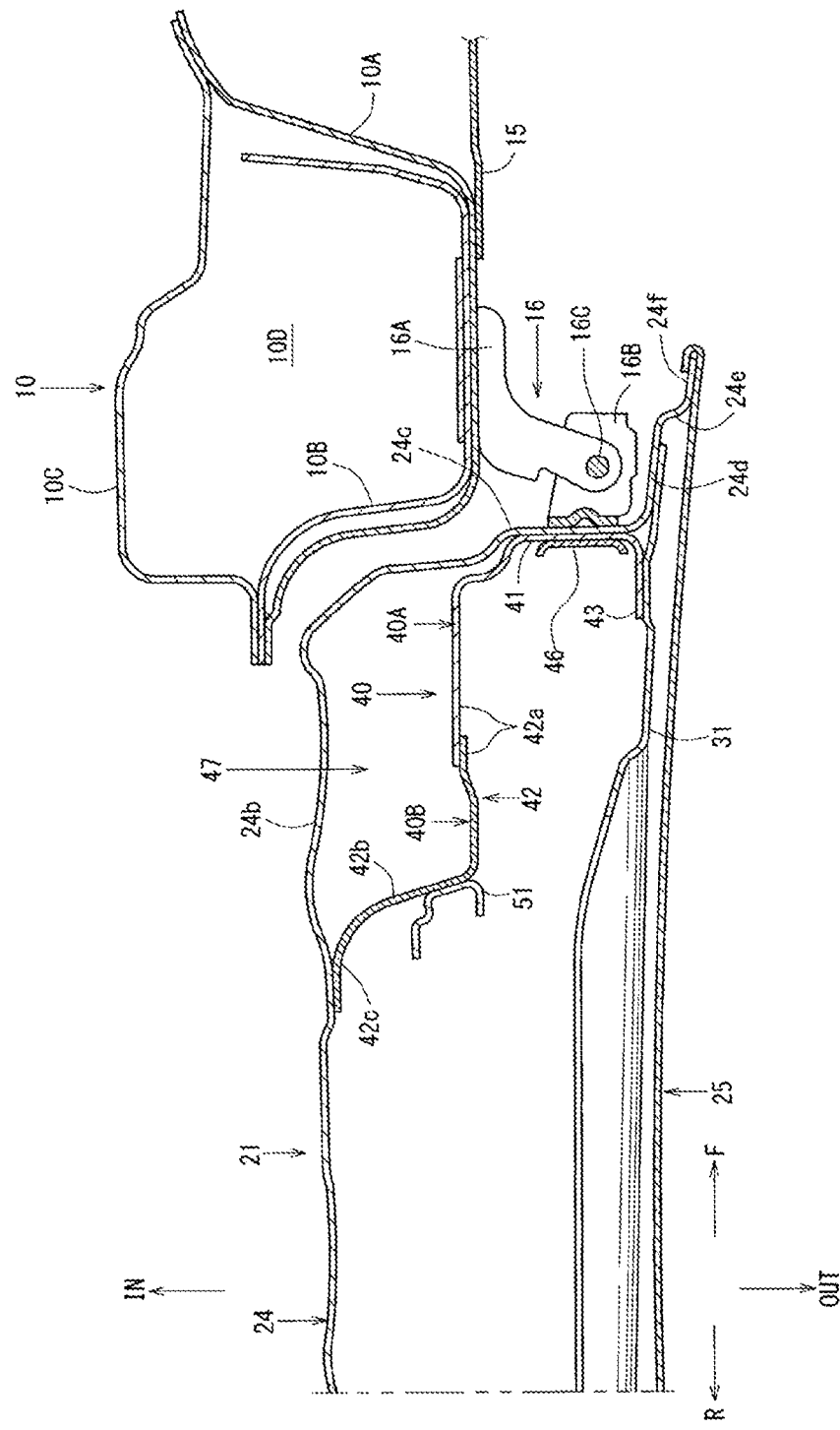
FIG. 4 is a sectional view taken along line B-B of FIG. 2.
Figure 5:
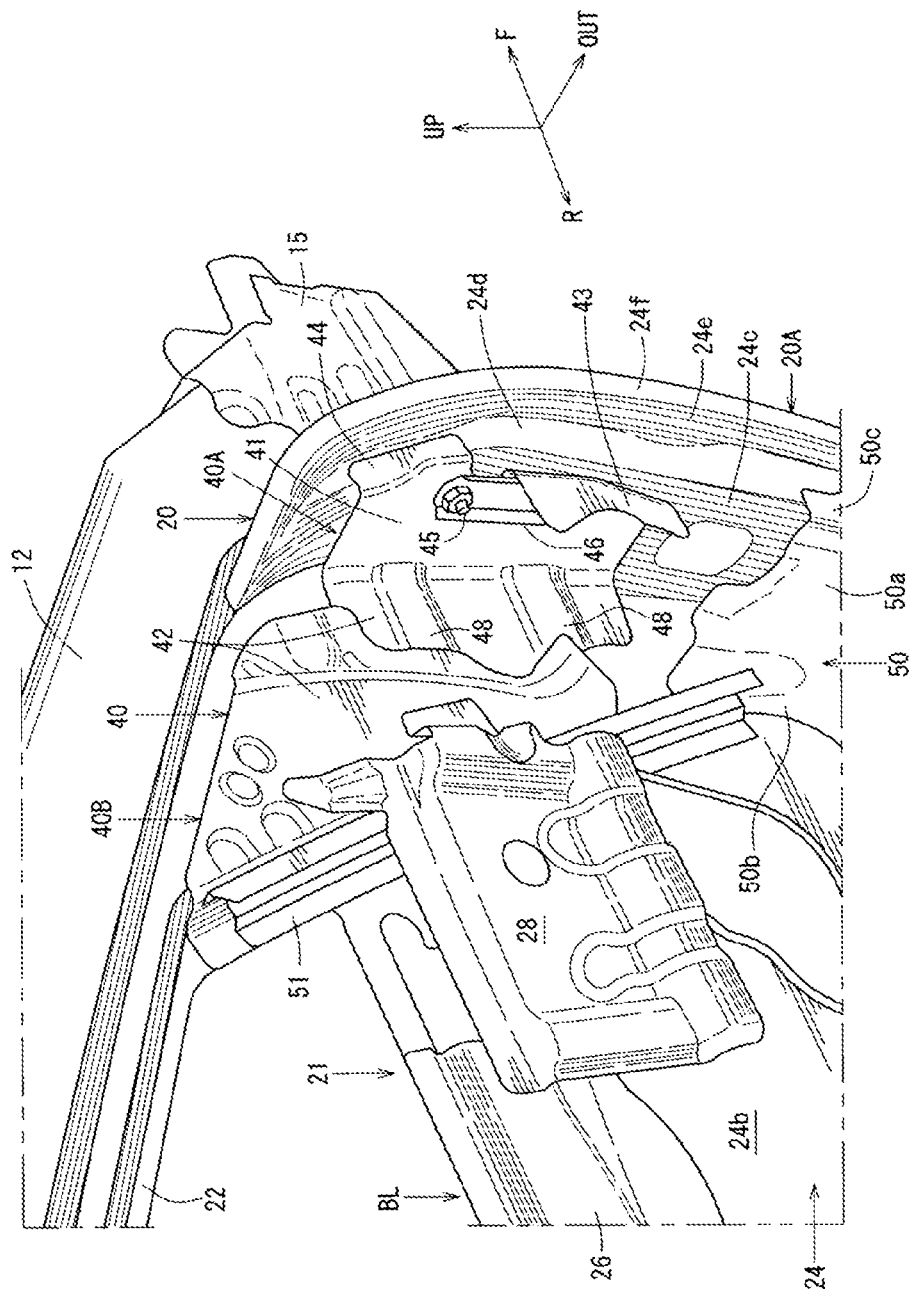
FIG. 5 is a perspective view of a major part of the door structure of the vehicle, when viewed from a rear-upper side.

Hereafter, an embodiment of the present invention will be specifically described referring to the drawings. The drawings show a door structure of a vehicle, and FIG. 1 is a side view of a present door structure of the vehicle in a state where a door outer panel is removed, FIG. 2 is a major-part enlarged view of FIG. 1, FIG. 3 is a sectional view taken along line A-A of FIG. 2, FIG. 4 is a sectional view taken along line B-B of FIG. 2, and FIG. 5 is a perspective view of a major part of the door structure of the vehicle, when viewed from a rear-upper side.

Figure 6:
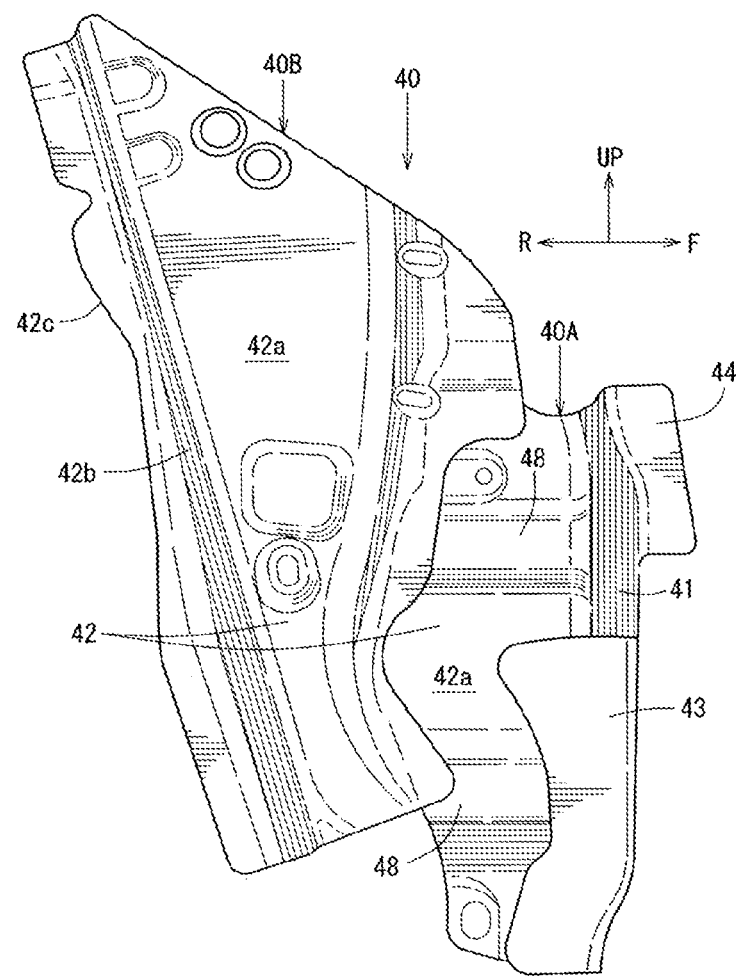
FIG. 6 is a side view of a hinge reinforcement.
Figure 7:
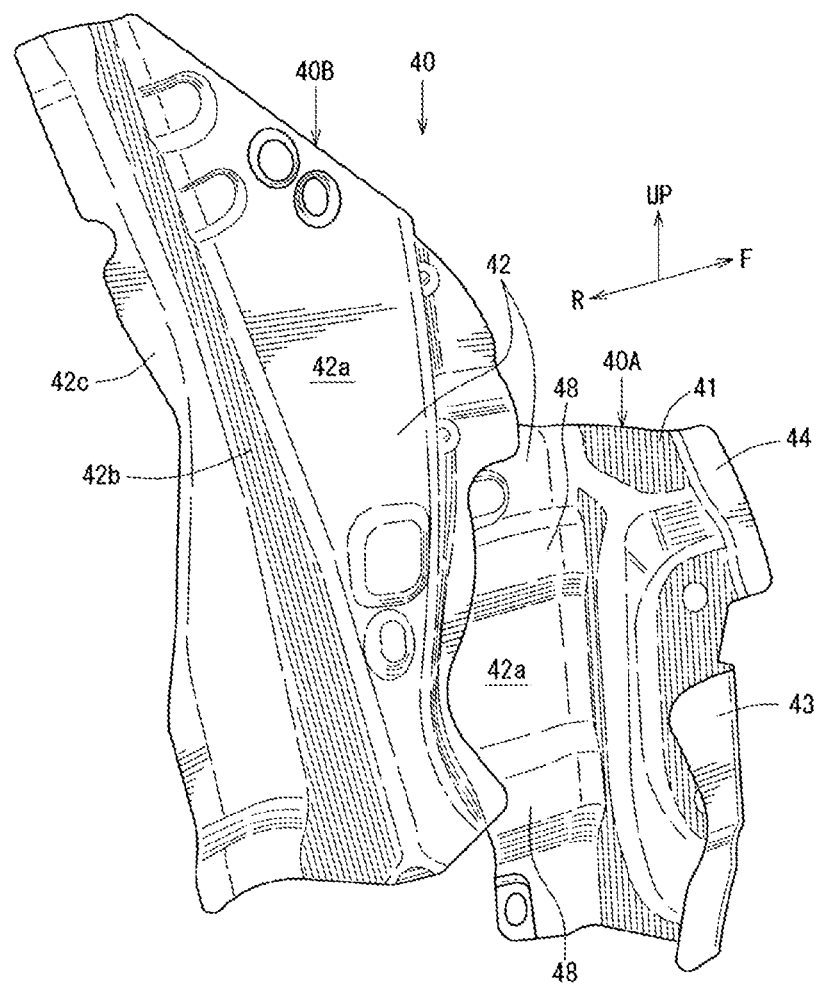
FIG. 7 is a rear perspective view of the hinge reinforcement.
Figure 8:
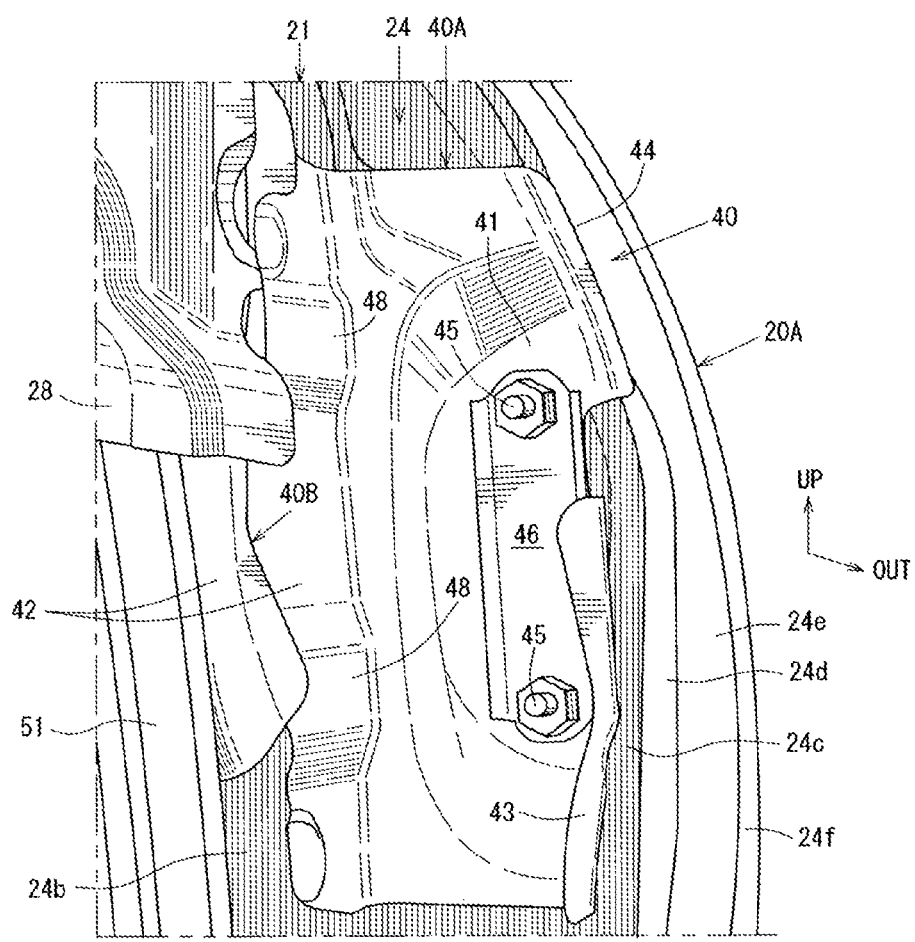
FIG. 8 is a perspective view showing a vertical position where a first joint portion and a second joint portion convert.
Figure 9:
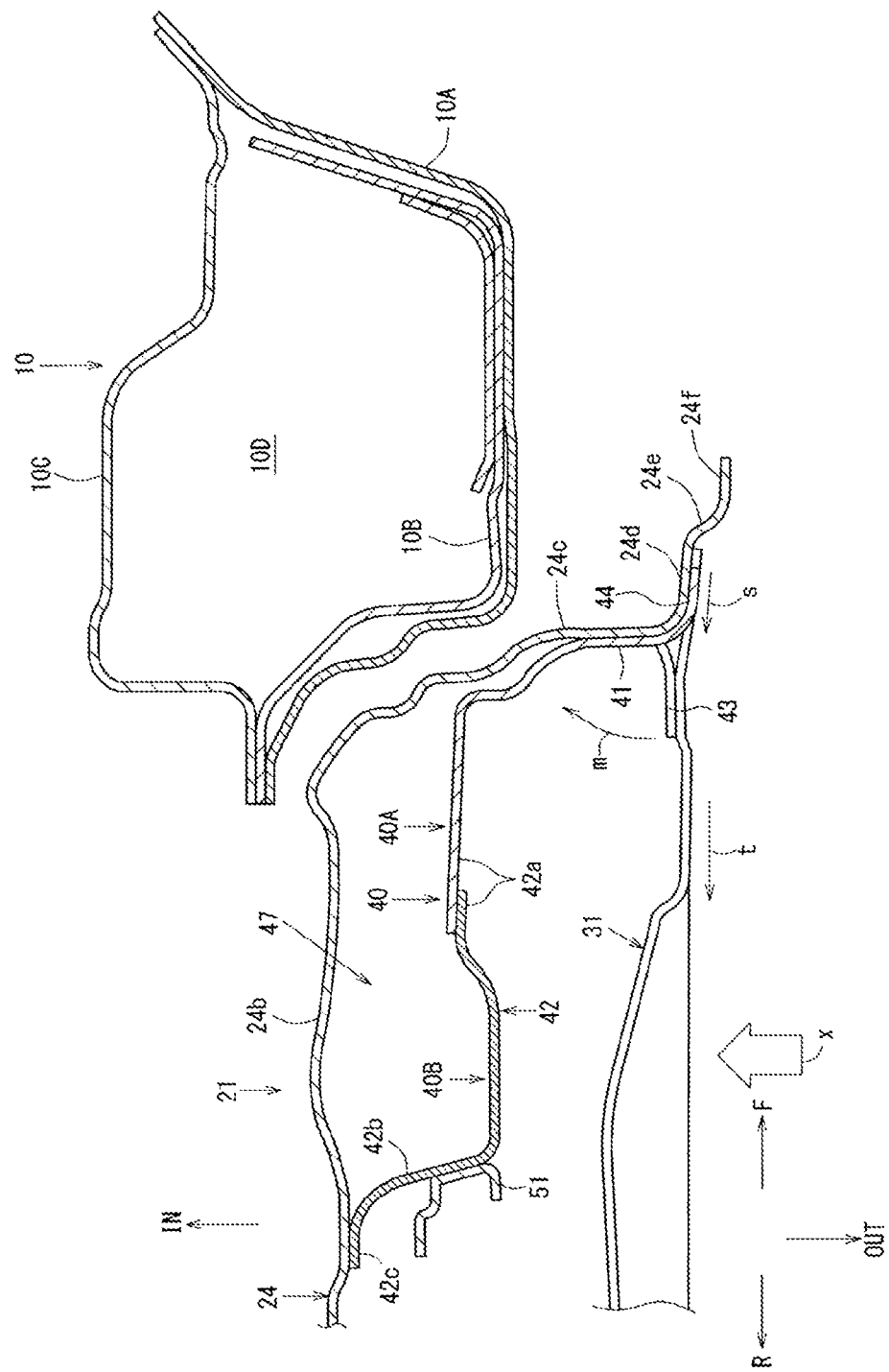
FIG. 9 is a sectional view of the door structure of the vehicle showing an operation of the door structure of the vehicle.

Further, FIG. 6 is a side view of a hinge reinforcement, FIG. 7 is a rear perspective view of the hinge reinforcement, FIG. 8 is a perspective view showing a vertical position where a first joint portion and a second joint portion convert, and FIG. 9 is a sectional view of the door structure of the vehicle showing an operation of the door structure of the vehicle.

In the following embodiment, a front door structure will be exemplified as the door structure of the vehicle. A vehicle-body structure around a door will be described first before describing the present door structure of the vehicle.

Figure 1:
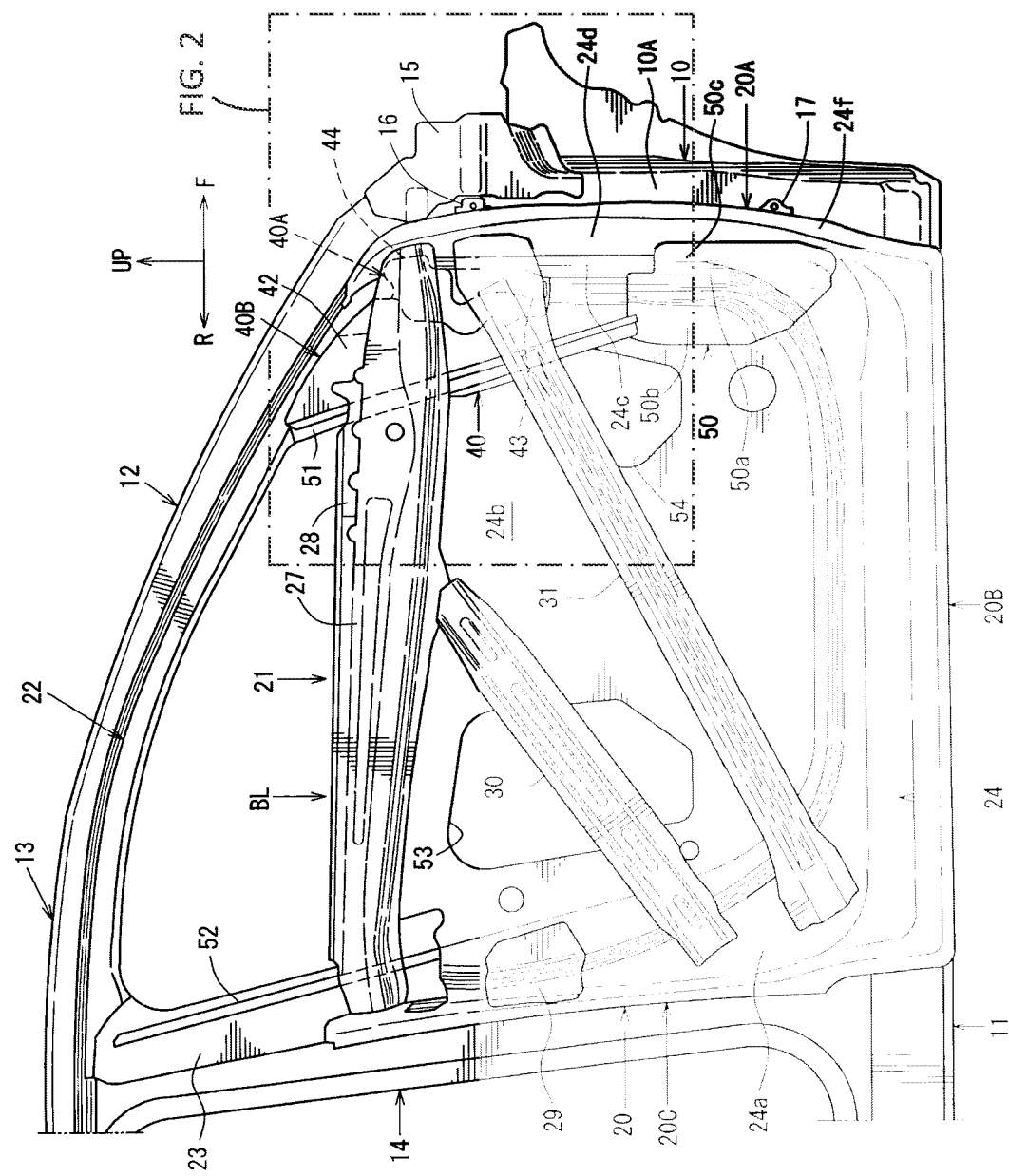
FIG. 1 is a side view of a door structure of a vehicle of the present invention in a state where a door outer panel is removed.

As shown in FIG. 1, a front-door opening is formed by a hinge pillar 10 which extends in a vertical direction at a front-side portion of a cabin, a side sill 11 which extends rearwardly from a lower end portion of the hinge pillar 10, a front pillar 12 which extends obliquely rearwardly-and-upwardly from an upper end portion of the hinge pillar 10, a roof side rail 13 which extends rearwardly continuously to the front pillar 12, and a center pillar 14 which interconnects the roof side rail 13 and the side sill 11 in the vertical direction.

As shown in FIGS. 3 and 4, the hinge pillar 10 is a vehicle-body reinforcing member, which has a hinge-pillar closed-cross section portion 10D extending in the vertical direction which is formed by a hinge-pillar outer panel 10A, a hinge-pillar reinforcement 10B, and a hinge-pillar inner panel 10C which are fixedly joined together.

As shown in FIGS. 3 and 4, a rear portion of an apron reinforcement 15 is fixedly joined to an outside face portion, in a vehicle width direction, of the hinge-pillar outer panel 10A. Further, the side sill 11 is another vehicle-body reinforcing member, which has a side-sill closed-cross section portion extending in a vehicle longitudinal direction which is formed by a side sill outer, a side sill inner, and a side sill reinforcement which are fixedly joined together. The front pillar 12 is further another vehicle-body reinforcing member, which has a front-pillar closed-cross section portion extending obliquely which is formed by a front pillar outer and a front-pillar inner which are fixedly joined together.

Moreover, the roof side rail 13 is further another vehicle-body reinforcing member, which has a roof-side closed-cross section portion extending substantially in the vehicle longitudinal direction which is formed by a roof side rail outer and a roof side rail inner which are fixedly joined together. The center pillar 14 is further another vehicle-body reinforcing member, which has a center-pillar closed-cross section portion extending in the vehicle vertical direction which is formed by a center pillar outer, a center pillar reinforcement, and a center pillar inner which are fixedly joined together.

As shown in FIGS. 1 and 4, a front door 20 is pivotally attached to the hinge-pillar outer panel 10A of the hinge pillar 10 via a pair of upper-and-lower door hinges 16, 17. This front door 20 covers the front-door opening enclosed by the hinge pillar 10, the side sill 11, the front pillar 12, the roof side rail 13, and the center pillar 14 so as to open or close this front-door opening.

The front door 20 comprises a door body portion 21 which is located below a beltline BL and a door sash portion 22 which is located above the beltline BL. A door pillar outer 23 which extends in the vertical direction is provided at a rear side portion of the door sash portion 22.

As shown in FIGS. 3 and 4, the door body portion 21 is formed by integrally connecting a door inner panel 24 and a door outer panel 25 through hemming process, and the door body portion 21 comprises a front side portion 20A where the pair of upper-and-lower door hinges 16, 17 are attached, a lower side portion 20B, and a rear side portion 20C.

As shown in FIGS. 1, 2 and 3, a beltline reinforcement inner 26 and a beltline reinforcement outer 27 which extend in the longitudinal direction along the beltline BL and are fixed to the door inner panel 24 are provided inside the door body portion 21.

Further, as shown in FIGS. 2 and 3, a door-mirror support bracket 28 to support a door mirror is provided between the beltline reinforcement inner 26 and the beltline reinforcement outer 27. Moreover, as shown in FIG. 1, a latch reinforcement 29 is fixedly joined to a portion of the door inner panel 24 at the rear side portion 20C which is positioned on a side of a door-inside space.

Additionally, as shown in FIG. 1, an upper impact bar 30 is provided between a lower portion of a middle part, in the longitudinal direction, of the beltline reinforcement outer 27 and a door flange portion 24a of the door inner panel 24 at the rear side portion 20C. This upper impact bar 30 extends obliquely in the longitudinal direction such that its front end is located at a higher level than its rear end, and is fixed.

Further, as shown in FIG. 1, a lower impact bar 31 is provided between a door flange portion 24d of the door inner panel 24 which is positioned at an upper side of the front side portion 20A and the door flange portion 24a of the door inner panel 24 at the rear side portion 20C which is located below a rear end of the upper impact bar 30. This lower impact bar 31 extends obliquely in the longitudinal direction such that its front end is located at a higher level than its rear end, and is fixed.

The lower impact bar 31 is arranged substantially in parallel to the above-described upper impact bar 30, and extends in the longitudinal direction inside the door body portion 21 and is fixed to the door inner panel 24. As shown in FIGS. 3 and 4, the door inner panel 24 of the door body portion 21 comprises a door inside face portion 24b, a door-hinge attachment face portion 24c, and the door flange portion 24d.

The door inside face portion 24b constitutes an inside, in the vehicle width direction, of the door body portion 21. The door-hinge attachment face portion 24c extends toward an outside, in the vehicle width direction, of the door from the door inside face portion 24b and constitutes an attachment face portion where the door hinges 16, 17 are fixed. Further, the door flange portion 24d is a flange portion which longitudinally extends in a direction away from a door center (forwardly, in the present embodiment) from an outside end portion, in the vehicle width direction, of the door-hinge attachment face portion 24c.

Further, a step portion 24e which extends toward the outside, in the vehicle width direction, of the door from the door flange portion 24d is provided, and an end flange portion 24f which longitudinally extends in the direction away from the door center from an outside end portion, in the vehicle width direction, of the step portion 24e is provided.

As shown in FIGS. 1 and 2, hinge reinforcements 40, 50 are provided at respective positions of the door-hinge attachment face portion 24c which correspond to the above-described upper-and-lower door hinges 16, 17 inside the door body portion 21. As shown in FIGS. 1, 2 and 5, the lower-side hinge reinforcement 50 comprises a reinforcement face portion 50a which corresponds to the door-hinge attachment face portion 24c of the door inner panel 24, an inside connection portion 50b which longitudinally extends in a direction approaching the door center from an inside end portion, in the vehicle width direction, of the reinforcement face portion 50a and is fixed to the door inside face portion 24b, and a joint portion 50c which longitudinally extends in the direction away from the door center from an outside end portion, in the vehicle width direction, of the reinforcement face portion 50a.

While the upper-side hinge reinforcement 40 is formed by two brackets 40A, 40B which are integrally joined together as shown in FIGS. 3-7, this hinge reinforcement 40 may be formed by a single bracket member. As shown in FIGS. 3-7, especially FIGS. 3 and 4, the hinge reinforcement 40 comprises a reinforcement face portion 41, an inside connection portion 42, a first joint portion 43, and a second joint portion 44.

The reinforcement face portion 41 is provided to face the door-hinge attachment face portion 24c of the door inner panel 24 and fixed to the door-hinge attachment face portion 24c. The inside connection portion 42 longitudinally extends in the direction approaching the center of the door body portion 21 from an inside end portion, in the vehicle width direction, of the reinforcement face portion 41 and is fixed to the door inside face portion 24b.

The first joint portion 43 (see FIG. 4) longitudinally extends in the direction approaching the center of the door body portion 21 from the reinforcement face portion 41 and is fixed to the lower impact bar 31. The second joint portion 44 (see FIG. 3) longitudinally extends in the direction away from the center of the door body portion 21 from an outside end portion, in the vehicle width direction, of the reinforcement face portion 41 and is fixed to the door flange portion 24d.

Thereby, since the first joint portion 43 is provided at the door-center side which is positioned on a side of a buckling point of the lower impact bar 31 in a side collision of the vehicle, the hinge reinforcement 40 follows bending deformation of the lower impact bar 31 by way of the first joint portion 43, so that a shearing load is inputted to the second joint portion 44. Accordingly, the second joint portion 44 is suppressed from being peeled off from the door flange portion 24d and consequently load transmission to the hinge pillar 10 as the vehicle body by way of the door hinge 16 becomes possible.

Further, as shown in FIGS. 2 and 4, the first joint portion 43 longitudinally extends in the direction approaching the center of the door body portion 21 from the outside end portion, in the vehicle width direction, of the reinforcement face portion 41 and is fixed to the lower impact bar 31, and the first joint portion 43 is arranged below the second joint portion 44.

Herein, as shown in FIG. 4, the door hinge 16 comprises a vehicle-body-side hinge bracket 16A, a door-side hinge bracket 16B, and a hinge pin 16C which pivotally connects the both brackets 16A, 16B. The door-side hinge bracket 16B is, as shown in FIGS. 4 and 8, fixed together to respective elements of the door-hinge attachment face portion 24c of the door inner panel 24, the reinforcement face portion 41 of the hinge reinforcement 40, and a plate 46 by using a pair of upper-and-lower fastening bolts 45, 45.

As shown in FIGS. 2 and 8, a vertical position where the first joint portion 43 positioned at a lower side and the second joint portion 44 positioned at an upper side convert is located between the pair upper-and-lower fastening bolts 45, 45 as a pair of fastening points of the door hinge 16 (specifically, the door-side hinge bracket 16B), so that the side-collision load inputted to the fastening points (see the fastening points by the fastening bolts 45) of the door hinge 16 is reduced properly.

As shown in FIGS. 3 and 4, the inside connection portion 42 comprises a first face portion 42a which extends in the longitudinal direction, a second face portion 42b which extends, in the vehicle width direction, toward the door inside face portion 24b from an end portion, in the longitudinal direction, of the first face portion 42a which is positioned on a side of the door center, and a flange portion 42c which longitudinally extends in the direction approaching the door center from an inside end, in the vehicle width direction, of the second face portion 42b.

Further, a closed-cross section portion 47 is formed between the inside connection portion 42 of the hinge reinforcement 40 and the door body portion 21 by fixedly joining the above-described flange portion 42c to the door inside face portion 24b of the door inner panel 24. This closed-cross section portion 47 suppresses deformation of the front door 20.

As shown in FIGS. 5-8, the inside connection portion 42 which is formed at the bracket 40A includes plural beads 48 which extend in the longitudinal direction. Thereby, the side-collision load is transmitted to the door inner panel 24 more properly in the vehicle side collision.

Meanwhile, as shown in FIGS. 1-4, a front-side glass guide 51 which extends in the vertical direction along the first face portion 42a is provided at the first face portion 42a of the hinge reinforcement 40. Further, as shown in FIG. 1, a rear-side glass guide 52 which extends in the vertical direction along a front portion of the door pillar outer 23 is provided. These pair of front-and-rear glass guides 51, 52 guide a door-side window glass (not illustrated) so that the door-side window glass can be elevated or lowered. Moreover, as shown in FIGS. 1 and 2, an opening portion for door-module arrangement 53 and an opening portion for speaker arrangement 54 are formed at the door inside face portion 24b of the door inner panel 24.

Operations (functions) of the door structure of the vehicle which is configured as described above will be described referring to FIG. 9. When a side-collision load shown by an arrow x is inputted to the lower impact bar 31 by way of the door outer panel 25, a middle portion, in the longitudinal direction, of the lower impact bar 31 is bent and deformed toward the inside, in the vehicle width direction, of the door. Herein, since the first joint portion 43 follows the deformation of the lower impact bar 31, a moment m is generated at the first joint portion 43 and a portion of the lower impact bar 31 where the first joint portion 43 is joined.

Accordingly, the lower impact bar 31 is longitudinally drawn in an arrow t direction approaching the door center and thereby a shearing load s is inputted to the second joint portion 44, so that the peeling-off of the second joint portion 44 is suppressed. Consequently, the side-collision load inputted to the hinge reinforcement 40 can be transmitted to the hinge pillar 10 as the vehicle body by way of the door hinge 16. Herein, in the figures, an arrow F shows a vehicle front (forward) side, an arrow R shows a vehicle rear (rearward) side, an arrow IN shows an inside (inward side) in the vehicle width direction, an arrow OUT shows an outside (outward side) in the vehicle width direction, and an arrow UP shows a vehicle upper (upward) side.

The above-described door structure of the first embodiment shown by FIGS. 1-9 comprises the door body portion 21 comprising the door inside face portion 24b constituting the inside, in the vehicle width direction, of the door, the door-hinge attachment face portion 24c extending toward the outside, in the vehicle width direction, of the door from the door inside face portion 24b, where the door hinge 16 is fixed, and the door flange portion 24d longitudinally extending in the direction away from the door center from the outside end portion, in the vehicle width direction, of the door-hinge attachment face portion 24c, the impact bar (the lower impact bar 31) extending in the longitudinal direction and fixed inside the door body portion 21, and the hinge reinforcement (the upper-side hinge reinforcement 40) provided at the door-hinge attachment face portion 24c inside the door body portion 21, wherein the hinge reinforcement 40 comprises the reinforcement face portion 41 which faces the door-hinge attachment face portion 24c, the inside connection portion 42 which longitudinally extends in the direction approaching the door center from the inside end portion, in the vehicle width direction, of the reinforcement face portion 41 and is fixed to the door inside face portion 24b, the first joint portion 43 which longitudinally extends in the direction approaching the door center from the reinforcement face portion 41 and is fixed to the impact bar (the lower impact bar 31), and the second joint portion 44 which longitudinally extends in the direction away from the door center from the outside end portion, in the vehicle width direction, of the reinforcement face portion 41 and is fixed to the door flange portion 24d (see FIGS. 3 and 4).

According to this structure, since the first joint portion 43 is provided at the door-center side which is positioned on the side of the buckling point of the impact bar (the lower impact bar 31) in the side collision of the vehicle, the hinge reinforcement 40 follows the bending deformation of the impact bar (the lower impact bar 31) by way of the first joint portion 43, so that the shearing load is inputted to the second joint portion 44. Accordingly, the second joint portion 44 is suppressed from being peeled off from the door flange portion 24d and consequently the load transmission to the vehicle body by way of the door hinge 16 is made possible.

Further, the side-collision load inputted to the hinge reinforcement 40 is dispersed to the door body portion 21 by the second joint portion 44, so that the pealing-off load inputted to the door-hinge attachment face portion 24c can be suppressed as well.

That is, even if the structure weight is kept light by avoiding any increase of the plate thickness or any additional reinforcement, the heeling-off/breakage of the joint portions 44, 43 where the hinge reinforcement 40 is fixed to the door flange portion 24d and the impact bar (the lower impact bar 31) is properly suppressed in the vehicle side collision, so that the load transmission to the vehicle body by way of the door hinge 16 is made possible.

Further, in the embodiment of the present invention, the first joint portion 43 longitudinally extends in the direction approaching the door center from the outside end portion, in the vehicle width direction, of the reinforcement face portion 41 and is fixed to the impact bar (the lower impact bar 31), and the first joint portion 43 is arranged below the second joint portion 44 (see FIG. 2).

According to this structure, the above-descried effects can be obtained by using the simple structure in which the first joint portion 43 arranged below the second joint portion 44 is configured to longitudinally extend in the direction approaching the door center from the outside end portion, in the vehicle width direction, of the reinforcement face portion 41 and be fixed to the impact bar (the impact bar 31).

Moreover, in the embodiment of the present invention, the vertical position where the first joint portion 43 and the second joint portion 44 convert is located between a pair of fastening points of the door hinge 16 (between the fastening bolts 45) (see FIG. 8).

According to this structure, the load inputted to the fastening points (the fastening bolts 45) of the door hinge 16 can be reduced properly.

Also, in the embodiment of the present invention, the inside connection portion 42 of the hinge reinforcement 40 comprises the first face portion 42a which extends in the longitudinal direction and the second face portion 42b which extends, in the vehicle width direction, toward the door inside face portion 24b from the end portion, in the longitudinal direction, of the first face portion 42a which is positioned on the side of the door center, and the closed-cross section portion 47 is formed between the inside connection portion 42 and the door body portion 21 (see FIGS. 3 and 4).

According to this structure, the deformation of the door (the front door 20) can be suppressed by the above-described closed-cross section portion 47.

Additionally, in the embodiment of the present invention, the inside connection portion 42 includes the beads 48 which extend in the longitudinal direction (see FIG. 5).

According to this structure, the side-collision load can be transmitted to the door inner panel 24 including the door inside face portion 24b more properly.

Embodiment 2

Figure 10:
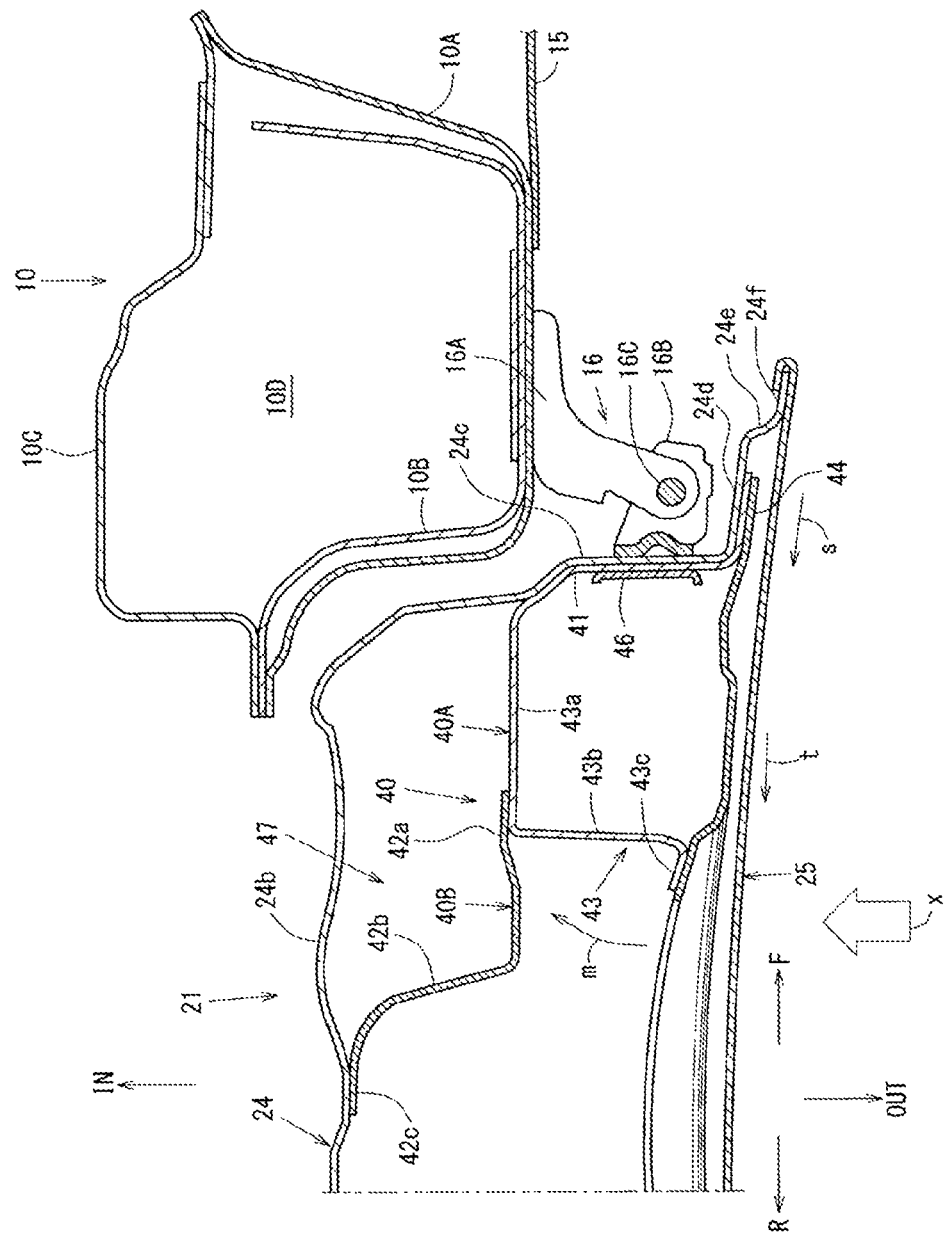
FIG. 10 is a sectional view of another embodiment of the door structure of the vehicle.

FIG. 10 is a sectional view of another embodiment of the door structure of the vehicle. In this second embodiment, a structure of the first joint portion 43 is different from the above-described first embodiment. The first joint portion 43 of the second embodiment comprises an extension portion 43a, a vertical wall 43b, and a flange portion 43c.

The extension portion 43a longitudinally extends in the direction approaching the center of the door body portion 21 from the inside end portion, in the vehicle width direction, of the reinforcement face portion 41. The vertical wall 43b extends toward the outside, in the vehicle width direction, of the door from an door-center-side end portion of the extension portion 43a. The flange portion 43c longitudinally extends in the direction approaching the center of the door body portion 21 from an outside end portion, in the vehicle width direction, of the vertical wall 43b and is fixed to the lower impact bar 31 as the impact bar.

In the second embodiment shown in FIG. 10, when the side-collision load shown by the arrow x is inputted to the lower impact bar 31 by way of the door outer panel 25, the middle portion, in the longitudinal direction, of the lower impact bar 31 is bent and deformed toward the inside, in the vehicle width direction, of the door.

Herein, since the flange portion 43c of the first joint portion 43 follows the deformation of the lower impact bar 31, the moment m is generated at the flange portion 43c and a portion of the lower impact bar 31 where the flange portion 43c is joined.

Accordingly, the lower impact bar 31 is longitudinally drawn in the arrow t direction approaching the door center and thereby the shearing load s is inputted to the second joint portion 44, so that the peeling-off of the second joint portion 44 is suppressed. Consequently, the side-collision load inputted to the hinge reinforcement 40 can be transmitted to the hinge pillar 10 as the vehicle body by way of the door hinge 16.

As described above, the first joint portion 43 of the second embodiment comprises the extension portion 43a which longitudinally extends in the direction approaching the door center from the inside end portion, in the vehicle width direction, of the reinforcement face portion 41, the vertical wall 43b which extends toward the outside, in the vehicle width direction, of the door from the end portion of the extension portion 43a which is positioned on the side of the door center, and the flange portion 43c which extends in the longitudinal direction from the outside end portion, in the vehicle width direction, of the vertical wall 43b and is fixed to the impact bar (the lower impact bar 31) (see FIG. 10).

According to this structure, since the first joint portion 43 is formed by the extension portion 43a, the vertical wall 43b, and the flange portion 43c, the workability (processability) of the first joint portion 43 can be improved. In FIG. 10, the same elements as those shown in the previous figures are denoted by the same reference characters, specific description of which will be omitted.

Embodiment 3

Figure 11:
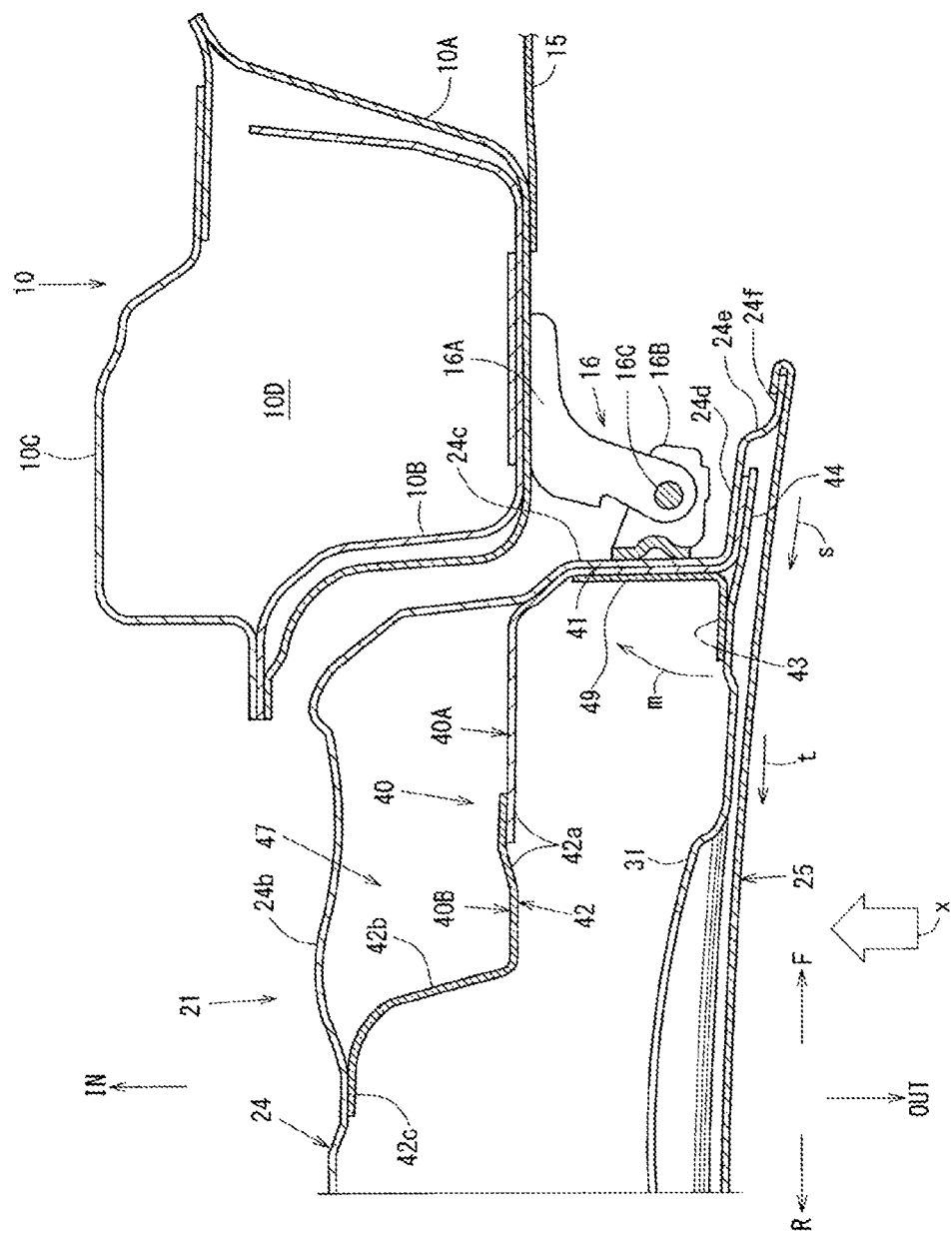
FIG. 11 is a sectional view of further another embodiment of the door structure of the vehicle.
Figure 12:
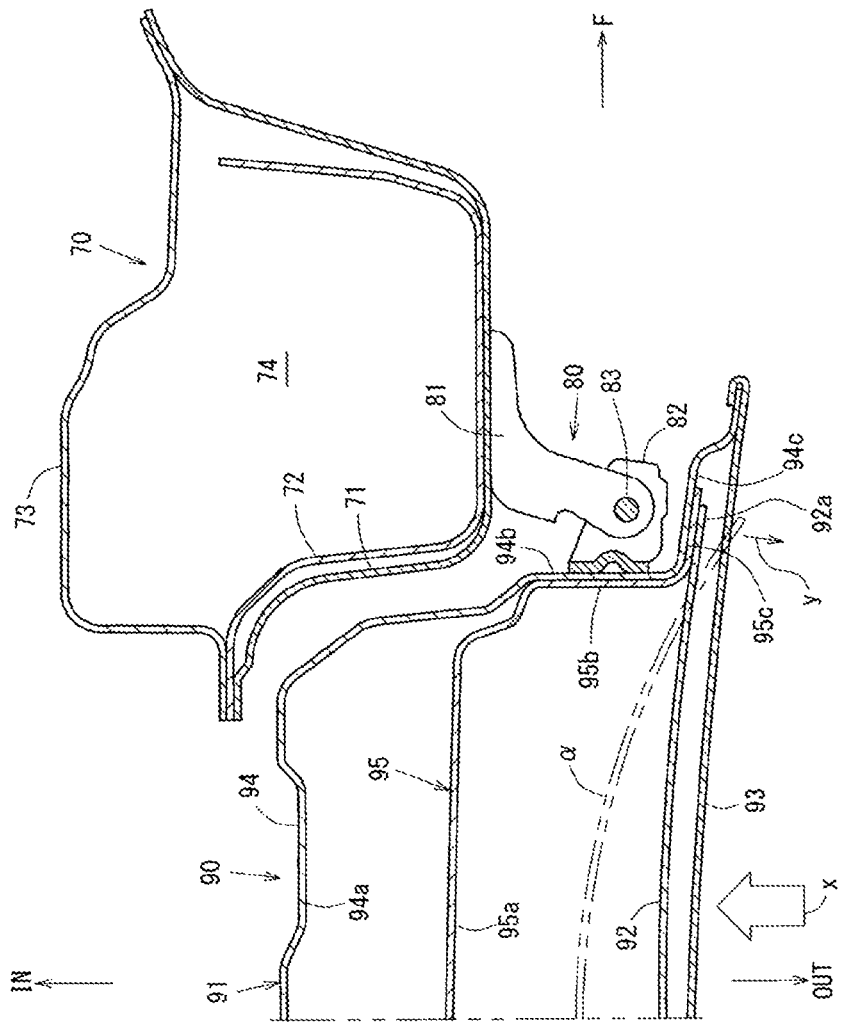
FIG. 12 is a sectional view of a conventional door structure of the vehicle.
Figure 13:
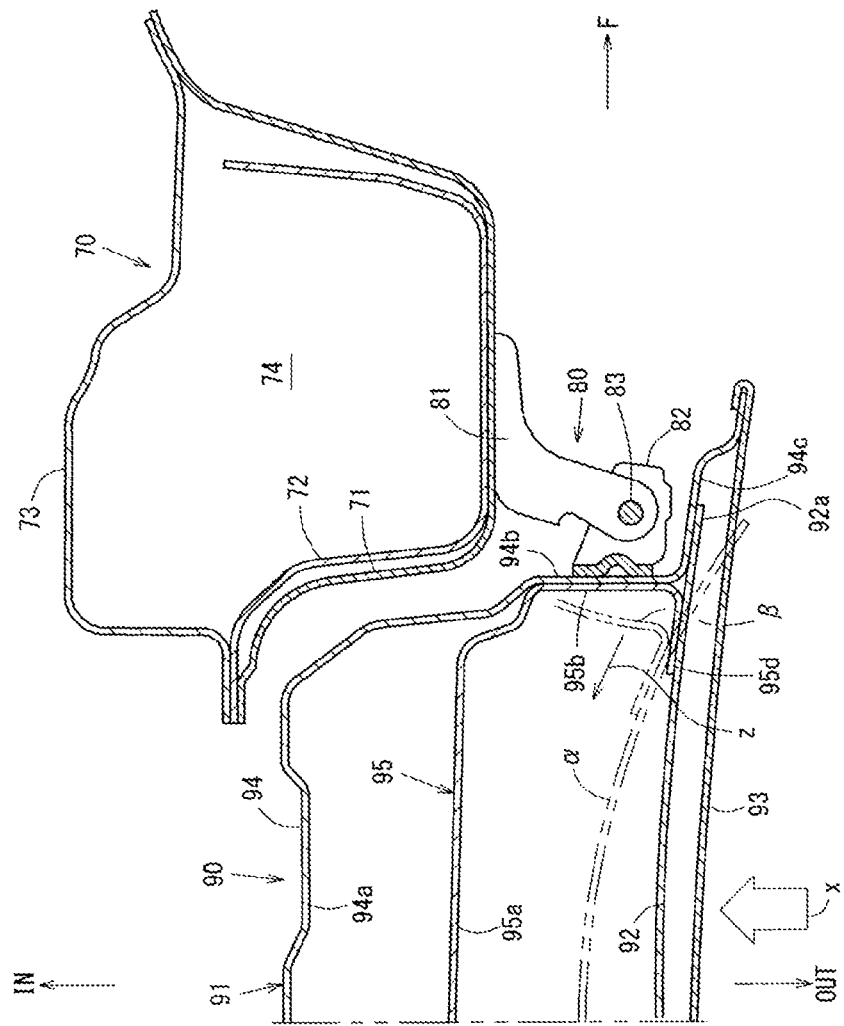
FIG. 13 is a sectional view of another conventional door structure of the vehicle.

FIG. 11 is a sectional view of further another embodiment of the door structure of the vehicle. In this third embodiment, the structure of the first joint portion 43 is different from the above-described first and second embodiments. The first joint portion 43 of the third embodiment longitudinally extends in the direction approaching the center of the door body portion 21 from the outside end portion, in the vehicle width direction, of the reinforcement face portion 41 and is fixed to the lower impact bar 31.

Specifically, a facing face portion 49 which closely faces the reinforcement face portion 41 and is fixed together to the reinforcement face portion 41 by the fastening bolts 45 (see the previous figures) is provided, and the first joint portion 43 which longitudinally extends in the direction approaching the center of the door body portion 21 from an outside end portion, in the vehicle width direction, of the facing face portion 49 and is fixed to the lower impact bar 31 is provided.

Herein, while a member which integrally forms the facing portion 49 and the first joint portion 43 in an L shape in a plan view is configured to be separate from the reinforcement face portion 41, the bracket 40A including the reinforcement face portion 41 and the first joint portion 43 may be formed by a single extrusion article. Further, the first joint portion 43 and the second joint portion 44 is located substantially at the same level.

In the third embodiment shown in FIG. 11, when the side-collision load shown by the arrow x is inputted to the lower impact bar 31 by way of the door outer panel 25, the middle portion, in the longitudinal direction, of the lower impact bar 31 is bent and deformed toward the inside, in the vehicle width direction, of the door.

Herein, since the first joint portion 43 follows the deformation of the lower impact bar 31, the moment m is generated at the first joint portion 43 and a portion of the lower impact bar 31 where the first joint portion 43 is joined.

Accordingly, the lower impact bar 31 is longitudinally drawn in the arrow t direction approaching the door center and thereby the shearing load s is inputted to the second joint portion 44, so that the peeling-off of the second joint portion 44 is suppressed. Consequently, the side-collision load inputted to the hinge reinforcement 40 can be transmitted to the hinge pillar 10 as the vehicle body by way of the door hinge 16.

As described above, the first joint portion 43 of the third embodiment longitudinally extends in the direction approaching the door center from the outside end portion, in the vehicle width direction, of the reinforcement face portion 41 and is fixed to the impact bar (the lower impact bar 31), and the first joint portion 43 and the second joint portion 44 are located substantially at the same level (see FIG. 11).

According to this structure, even if the structure is rather simple, the first joint portion 43 and the second joint portion 44 can be located substantially at the same level, so that a moment of the first joint portion 43 which is generated at the first joint portion 43 by the bending deformation of the lower impact bar 31 can be easily transmitted to the second joint portion 44.

In correspondence between the present invention and the above-described embodiments, the door of the present invention corresponds to the front door 20. Likewise, the direction away from the door center corresponds to the vehicle forward (front) direction of the front door 20 which is shown by the arrow F, the direction approaching the door center corresponds to the vehicle rearward (rear) direction of the front door 20 which is shown by the arrow R, the impact bar corresponds to the lower impact bar 31, the hinge reinforcement corresponds to the upper-side hinge reinforcement 40, the door hinge corresponds to the upper-side hinge 16, and the fastening point of the door hinge corresponds to the fastening bolts 45, 45. However, the present invention should not be limited to the above-described embodiments.

For example, while the above-described embodiments exemplifies a case where the door structure of the vehicle according to the present invention is applied to the front door 20, the present door structure is applicable to a double-hinge rear door. In this case, the above-described direction away from the door center means the vehicle rearward (rear) direction, and the above-described direction approaching the door center means the vehicle forward (front) direction.

What is claimed is:

1. A door structure of a vehicle, comprising:
a door body portion comprising a door inside face portion constituting an inside, in a vehicle width direction, of a door, a door-hinge attachment face portion extending toward an outside, in the vehicle width direction, of the door from the door inside face portion, where a door hinge is fixed, and a door flange portion longitudinally extending in a direction away from a door center from an outside end portion, in the vehicle width direction, of the door-hinge attachment face portion;
an impact bar extending in the longitudinal direction and fixed inside the door body portion; and
a hinge reinforcement provided at the door-hinge attachment face portion inside the door body portion,
wherein said hinge reinforcement comprises a reinforcement face portion which faces said door-hinge attachment face portion, an inside connection portion which longitudinally extends in a direction approaching the door center from an inside end portion, in the vehicle width direction, of said reinforcement face portion and is fixed to said door inside face portion, a first joint portion which longitudinally extends in the direction approaching the door center from said reinforcement face portion and is fixed to said impact bar, and a second joint portion which longitudinally extends in the direction away from the door center from an outside end portion, in the vehicle width direction, of said reinforcement face portion and is fixed to said door flange portion,
wherein a vertical position where said first joint portion and said second joint portion convert is located between a pair of fastening points of the door hinge.

2. The door structure of the vehicle of claim 1, wherein said first joint portion longitudinally extends in the direction approaching the door center from the outside end portion, in the vehicle width direction, of said reinforcement face portion and is fixed to said impact bar, and said first joint portion is arranged below said second joint portion.

3. The door structure of the vehicle of claim 2, wherein said inside connection portion of the hinge reinforcement comprises a first face portion which extends in the longitudinal direction and a second face portion which extends, in the vehicle width direction, toward said door inside face portion from an end portion, in the longitudinal direction, of said first face portion which is positioned on a side of the door center, and a closed-cross section portion is formed between said inside connection portion and said door body portion.

4. The door structure of the vehicle of claim 3, wherein said inside connection portion includes a bead which extends in the longitudinal direction.

5. The door structure of the vehicle of claim 1, wherein said first joint portion of the hinge reinforcement comprises an extension portion which longitudinally extends in the direction approaching the door center from said inside end portion, in the vehicle width direction, of the reinforcement face portion, a vertical wall which extends toward the outside, in the vehicle width direction, of the door from an end portion of said extension portion which is positioned on a side of the door center, and a flange portion which extends in the longitudinal direction from an outside end portion, in the vehicle width direction, of said vertical wall and is fixed to said impact bar.

6. The door structure of the vehicle of claim 1, wherein said first joint portion of the hinge reinforcement longitudinally extends in the direction approaching the door center from said outside end portion, in the vehicle width direction, of the reinforcement face portion and is fixed to said impact bar, and said first joint portion and said second joint portion are located substantially at the same level.

7. The door structure of the vehicle of claim 1, wherein said inside connection portion of the hinge reinforcement comprises a first face portion which extends in the longitudinal direction and a second face portion which extends, in the vehicle width direction, toward said door inside face portion from an end portion, in the longitudinal direction, of said first face portion which is positioned on a side of the door center, and a closed-cross section portion is formed between said inside connection portion and said door body portion.

8. A door structure of a vehicle, comprising:
a door body portion comprising a door inside face portion constituting an inside, in a vehicle width direction, of a door, a door-hinge attachment face portion extending toward an outside, in the vehicle width direction, of the door from the door inside face portion, where a door hinge is fixed, and a door flange portion longitudinally extending in a direction away from a door center from an outside end portion, in the vehicle width direction, of the door-hinge attachment face portion;
an impact bar extending in the longitudinal direction and fixed inside the door body portion; and
a hinge reinforcement provided at the door-hinge attachment face portion inside the door body portion,
wherein said hinge reinforcement comprises a reinforcement face portion which faces said door-hinge attachment face portion, an inside connection portion which longitudinally extends in a direction approaching the door center from an inside end portion, in the vehicle width direction, of said reinforcement face portion and is fixed to said door inside face portion, a first joint portion which longitudinally extends in the direction approaching the door center from said reinforcement face portion and is fixed to said impact bar, and a second joint portion which longitudinally extends in the direction away from the door center from an outside end portion, in the vehicle width direction, of said reinforcement face portion and is fixed to said door flange portion, wherein said inside connection portion includes a bead which extends in the longitudinal direction.

9. The door structure of the vehicle of claim 2, wherein said inside connection portion includes a bead which extends in the longitudinal direction.

10. The door structure of the vehicle of claim 1, wherein said inside connection portion includes a bead which extends in the longitudinal direction.

11. A door structure of a vehicle, comprising:

a door body portion comprising a door inside face portion positioned on a side of an inside, in a vehicle width direction, of a door, a door-hinge attachment face portion extending toward an outside, in the vehicle width direction, of the door from the door inside face portion, where a door hinge is fixed, and a door flange portion extending rearwardly from an outside end portion, in the vehicle width direction, of the door-hinge attachment face portion;

an impact bar extending in a longitudinal direction and fixed inside the door body portion; and a hinge reinforcement provided at the door-hinge attachment face portion inside the door body portion, wherein said hinge reinforcement comprises a reinforcement face portion which faces said door-hinge attachment face portion, an inside connection portion which extends forwardly from an inside end portion, in the vehicle width direction, of said reinforcement face portion and is fixed to said door inside face portion, a first joint portion which extends forwardly from said reinforcement face portion and is fixed to said impact bar, and a second joint portion which extends rearwardly from an outside end portion, in the vehicle width direction, of said reinforcement face portion and is fixed to said door flange portion.

* * * * *